(12) United States Patent
Agee et al.

(10) Patent No.: US 9,677,005 B1
(45) Date of Patent: *Jun. 13, 2017

(54) INTEGRATED FUEL PROCESSING WITH BIOMASS OIL

(71) Applicant: Emerging Fuels Technology, Inc., Tulsa, OK (US)

(72) Inventors: Kenneth L. Agee, Tulsa, OK (US); Mark A. Agee, Tulsa, OK (US); Rafael Espinoza, Tulsa, OK (US); Kym Brian Arcuri, Tulsa, OK (US)

(73) Assignee: Emerging Fuels Technology, Inc., Tulsa, OK (US)

( * ) Notice: Subject to any disclaimer, the term of this patent is extended or adjusted under 35 U.S.C. 154(b) by 19 days.

This patent is subject to a terminal disclaimer.

(21) Appl. No.: 14/260,378

(22) Filed: Apr. 24, 2014

Related U.S. Application Data

(63) Continuation-in-part of application No. 13/529,599, filed on Jun. 21, 2012.

(60) Provisional application No. 61/499,545, filed on Jun. 21, 2011.

(51) Int. Cl.
 *C10G 2/00* (2006.01)
 *C10G 1/00* (2006.01)

(52) U.S. Cl.
 CPC ............... *C10G 2/30* (2013.01); *C10G 1/002* (2013.01)

(58) Field of Classification Search
 USPC ....... 585/254, 303, 240, 241, 242, 250, 252, 585/257, 275, 300, 310, 314, 330, 379, 585/440; 208/17, 78
 See application file for complete search history.

(56) References Cited

U.S. PATENT DOCUMENTS

| | | | |
|---|---|---|---|
| 4,992,605 A | 2/1991 | Craig et al. | |
| 5,506,272 A | 4/1996 | Benham et al. | |
| 7,928,273 B2 | 4/2011 | Bradin | |
| 7,982,079 B2 | 7/2011 | Marker et al. | |
| 9,062,257 B1* | 6/2015 | Agee .......................... | C07C 1/04 |
| 2008/0110080 A1 | 5/2008 | Ansell et al. | |
| 2008/0275278 A1 | 11/2008 | Clark | |
| 2009/0229174 A1 | 9/2009 | Brady et al. | |
| 2009/0287029 A1 | 11/2009 | Anumakonda et al. | |
| 2009/0294324 A1* | 12/2009 | Brandvold ................ | C10L 1/04 208/17 |
| 2009/0300971 A1 | 12/2009 | Abhari et al. | |
| 2009/0301930 A1 | 12/2009 | Brandvold et al. | |
| 2010/0031572 A1 | 2/2010 | Ansorge et al. | |

(Continued)

*Primary Examiner* — Prem C Singh
*Assistant Examiner* — Chantel Graham
(74) *Attorney, Agent, or Firm* — Head, Johnson, Kachigian & Wilkinson, PC

(57) ABSTRACT

A gas to liquids process with a reduced $CO_2$ footprint to convert both natural gas and a renewable feedstock material into fuels or chemicals. In one embodiment of the invention, a natural gas feed is converted into synthesis gas containing hydrogen and carbon monoxide. A minor portion of the hydrogen is thereafter extracted from the synthesis gas. The synthesis gas is converted to hydrocarbons in a Fischer Tropsch reaction. The Fischer Tropsch hydrocarbon product and a renewable feedstock are hydroprocessed with the extracted hydrogen in order to produce fuels and/or chemicals. Waste products from the renewable feed are recycled to produce additional synthesis gas for the Fischer Tropsch reaction.

13 Claims, 2 Drawing Sheets

(56) References Cited

U.S. PATENT DOCUMENTS

| | | |
|---|---|---|
| 2010/0069690 A1 | 3/2010 | Gudde |
| 2010/0223839 A1* | 9/2010 | Garcia-Perez ............ C01B 3/34 |
| | | 44/313 |
| 2010/0317903 A1 | 12/2010 | Knuuttila |
| 2010/0331586 A1 | 12/2010 | Hanks et al. |
| 2011/0071327 A1 | 3/2011 | Abhari et al. |
| 2011/0113676 A1 | 5/2011 | Mackay et al. |
| 2011/0155631 A1 | 6/2011 | Knuuttila et al. |
| 2011/0172475 A1* | 7/2011 | Peters ....................... C07C 1/24 |
| | | 585/254 |
| 2011/0178185 A1 | 7/2011 | Blevins et al. |
| 2012/0208902 A1* | 8/2012 | Kresnyak ................. C10G 2/30 |
| | | 518/702 |
| 2012/0213726 A1* | 8/2012 | Green ....................... C07C 6/04 |
| | | 424/70.24 |

* cited by examiner

INTEGRATED FUEL PROCESSING WITH BIOMASS OIL

CROSS-REFERENCE TO RELATED APPLICATIONS

This application is a continuation-in-part of U.S. patent application Ser. No. 13/529,599, filed Jun. 21, 2012, which claims priority to U.S. Provisional Patent Application Ser. No. 61/499,545, filed Jun. 21, 2011, both of which are incorporated herein by reference.

BACKGROUND OF THE INVENTION

1. Field of the Invention

The present invention relates to a process to co-process renewable feedstock materials with a gas to liquids process wherein at least a portion of hydrogen used to process the renewable materials is produced in a gas to liquids process.

2. Prior Art

Mixtures of triglycerides and fatty acids can be hydro-processed to produce chemicals and fuels, such as jet and diesel fuel. Sources of renewable feed can be seed oils, crop oils, animal fats, recycled greases and oils including soy oil, jatropha, camalina, palm oil, yellow grease, and other natural materials. The processing of these materials requires a considerable volume of hydrogen. By-products include $CO_2$, water, propane and other light hydrocarbons. These natural feed materials are generally considered to be a renewable resource and are increasingly desirable sources to produce fuels in a sustainable manner. The production and use of fuels made from these resources also result in a very low production of greenhouse gases.

Triglyceride feeds have been converted to fuels via a transesterification reaction with methanol to make biodiesel for many years. This process is becoming less desirable as it produces a lower quality fuel. These same renewable feedstocks can be converted to high quality fuels by processing with hydrogen over a catalyst. This has been practiced as a standalone operation or by co-processing in a conventional refinery.

The present invention provides a novel process to convert renewable feed materials to fuels and chemicals by integrating operations with a gas to liquids process.

A gas to liquids ("GTL") process integrates several process steps to convert natural gas into fuels and/or chemicals.

First, natural gas is reacted with steam and/or oxygen to produce synthesis gas comprising carbon monoxide and hydrogen. This is a high temperature reaction involving a complex series of reforming and combustion reactions. This step is typically catalytic and may be performed in a steam methane reformer ("SMR") or an autothermal reformer ("ATR"). This step can also be accomplished non-catalytically in a partial oxidation reactor. As will be described herein in detail, a preferred method of the present invention is to use an ATR.

The synthesis gas produced in the first step is cooled and cleaned before further use. This may also include adjusting the $H_2$:CO ratio to accommodate downstream requirements.

The second step in the GTL process is conversion of the synthesis gas to hydrocarbon products. This is typically a Fischer Tropsch reaction carried out over an iron based or cobalt based catalyst. The reactor can take a number of forms, including a fixed bed, fluidized bed, ebullating bed, microchannel or slurry bubble column reactor. The catalyst and reactor must be carefully matched to account for synthesis gas and product concentrations and heat transfer limitations to operate at the desired performance.

The third step of the GTL process is to upgrade the raw hydrocarbon products from the Fischer Tropsch reactor to produce one or more products that meet a defined specification. For example, if a middle distillate fuel is the desired product, it could be refined to meet ASTM D-975 specifications.

The foregoing three key steps of the GTL process are integrated with utilities such as oxygen production, power generation, water treating, steam production and hydrogen management to meet the objectives of a specific plant design. The GTL process also requires additional infrastructure, such as safety systems, flares, tanks, loading facilities to transport products and maintenance facilities, etc.

An objective of the present invention is to use the GTL process to leverage production of renewable products. This can be done with any GTL process, but a preferred embodiment is to utilize small modular GTL. Small, as used herein, is defined as between 500 to 5,000 barrels per day ("BPD"). The reason for this preference is the relative size of typical renewable feedstock options. Renewable materials are typically available in limited quantities at any given location, for example, 500 to 1,000 BPD. For a small, modular GTL plant, this is a good fit and the co-processing of the renewable feed can be advantageous to the GTL plant. For large 50,000 to 100,000 BPD plants, the relatively small volumes of renewable materials are too small to make a significant contribution to the plant production.

There is currently a good deal of interest in production of renewable fuels. One method of producing renewable fuels is to gasify a raw renewable carbonaceous material to produce synthesis gas and use a Fischer Tropsch reaction to produce hydrocarbon products for upgrading. The chemistry of this process is similar to a GTL process, but the process is much more complex. In the case of a renewable biomass feed, it is typically an irregular shaped solid material that must be stored on site, fed by auger or screw into a gasifier, which typically operates at lower pressure. The resulting synthesis gas must then be compressed and can have a variety of contaminants, such as sulfur and halogen compounds, minerals, tars, particulates and ash, that must be removed to very low levels required by the Fischer Tropsch catalyst. By comparison, natural gas flows into a GTL plant under pressure. It has a well-defined composition with relatively few contaminants and commercial proven methods for cleanup. Commercial SMR's and ATR's have demonstrated operation at intermediate pressure (20-40 bars), which is ideal for Fischer Tropsch operation without further compression.

Another method to produce renewable fuels is to hydroprocess a renewable fat or oil, such as crop oils, animal fats, algae oils or a polymer such as recycled plastics. These materials can be processed with hydrogen to reduce the oxygen content and/or molecular weight, thus deriving a marketable hydrocarbon product. One of the challenges for processing these materials is the availability of hydrogen. Hydrogen is expensive to produce and requires significant infrastructure.

The objective of the present invention is to utilize the infrastructure and resources of a GTL process, preferably a small modular GTL process to co-process renewable feedstocks to provide an integrated fuel processing system. Four key elements of the integrated process result in improved efficiency and economics:

1. Hydrogen from the GTL process—a typical SMR produces a synthesis gas with a $H_2$:CO ratio of 3:1. A typical ATR produces a ratio of 2.2 to 2.6:1. Methane as a feedstock has a very high $H_2$:CO ratio (2:1) compared to a biomass feed, which is typically closer to 1:1. Therefore, the synthesis gas obtained by conversion of natural gas by the best available technology and the highest efficiency possible will typically have excess $H_2$ greater than the 2:1 ratio required by the Fischer Tropsch reaction. This hydrogen can be removed and purified for downstream processing, such as upgrading Fischer Tropsch products and co-processing of renewable products.

2. GTL infrastructure—a GTL plant will have a significant amount of utilities and infrastructure that can be leveraged for co-processing a renewable feed. If the renewable feed is processed in a standalone plant, significant infrastructure would be required. Most of this infrastructure is already in place with a GTL plant with few additions required for the incremental co-processing load.

3. Light product gas utilization—hydroprocessing of the renewable feed results in loss of product as the glycerides are decomposed into CO, $CO_2$, $H_2O$ and light hydrocarbons. In a standalone plant producing fuels from these feeds, the light gas products cannot be recycled. Some of the light gases can be collected as liquefied petroleum gas ("LPG"), but it has lower value. In the integrated process of the present invention, these light gas products, which can be as much as 15% of the feed, can be recycled to the reformer for production of synthesis gas which can then be converted to liquid products. This renewable material now becomes part of the Fischer Tropsch product.

4. Reduced $CO_2$ footprint—the integrated process of the present invention results in a reduced level of $CO_2$ added to the atmosphere for the volume of products produced. By recycling waste products from the hydroprocessing of the renewable feed, a portion of the synthesis gas, and hence a portion of the Fischer Tropsch products, are based on carbon from the renewable source. While the Fischer Tropsch products are predominately made from natural gas, the renewable content could be as high as 40% when using a SMR to generate the synthesis gas. The Fischer Tropsch and renewable products both require further processing with hydrogen to make finished products.

The upgrading of these products can be done together or separate. The Fischer Tropsch products to be upgraded typically include paraffin hydrocarbons from C5 to C100. The long chain products C21+ can be hydrocracked to middle distillate fuels or can be hydroprocessed to make solvents, waxes or lube base oils. For waxes and base oils, it is desirable to minimize cracking, in which case the heavy Fischer Tropsch products will be upgraded separately. If the target is middle distillate fuels, the heavy Fischer Tropsch waxy products (C21+) may be co-processed with the renewable feed. In either case, the hydroprocessed product can be blended and distilled or kept separate and distilled into finished products. The final product upgrading configuration is defined by the product target specifications. The finished products, whether derived from natural gas or renewable feed, will be totally compatible and can be blended in any proportion with each other or with other petroleum derived products. Products that are co-processed may result in renewable content of from 1% to 80%. When the renewable products are processed separately, the renewable content of those products is 100%. However, the separately processed GTL products will still have a small renewable content of 1% to 40% due to utilization of the light gases, which are not part of the desired product slate, from the renewable materials that are recycled to make additional synthesis gas.

The broad range of potential renewable content in the products is based on the range of excess hydrogen available, depending on the configuration of the reforming section of the GTL plant and the ratio of renewable feedstock to Fischer Tropsch derived hydrocarbons available for hydroprocessing. A SMR can be operated efficiently to produce synthesis gas in an approximately 3:1 $H_2$:CO ratio. The Fischer Tropsch reaction requires synthesis gas in approximately 2:1 ratio. Therefore, in the case of a SMR, there is substantial potential for excess hydrogen. This excess hydrogen is typically recycled and used as fuel in the SMR, but could be used for downstream hydroprocessing, resulting in a substantial volume of hydrogen available for hydroprocessing. In this case, the amount of renewable feed could result in approximately three times as much renewable product as Fischer Tropsch product. Theoretically, the SMR synthesis gas could be shifted to all hydrogen and then the synthesis gas plant would be strictly a hydrogen source that could process 100% renewable feed. That configuration is not part of the scope of the present invention.

The objective of the present invention is to efficiently utilize a GTL plant to leverage additional production of renewable feedstocks. The advantage to the GTL plant is to reduce the $CO_2$ footprint of the plant and utilize the infrastructure and hydrogen of the plant to produce additional products. This includes leveraging the light gas products from hydrodeoxygenating a renewable feed to produce additional synthesis gas for the Fischer Tropsch reaction, such products also being of a renewable nature. In the case of an ATR, the amount of excess hydrogen is much less, resulting in a renewable feed limit approximately equal to the Fischer Tropsch production. The renewable feed could also be less, depending on availability, hence the broad range. With the SMR being the practical limit of the present invention for excess hydrogen available for downstream processing and assuming the renewable feedstock is not limiting, the maximum renewable content of a blended product is approximately 80%. If the products are hydroprocessed separately, the Fischer Tropsch derived products could have approximately 40% renewable content due to recycling of light gas components.

Co-processing of the renewable feeds has been proposed by Mackay et al. (U.S. Patent Publication No. 2011/0113676). In this reference, municipal solid waste ("MSW") is the primary feed. The MSW is refined to produce a refuse derived fuel ("RDF") that is depleted of inorganics. The RDF is gasified to make synthesis gas. The synthesis gas is converted to a Fischer Tropsch raw product. Excess hydrogen is used to upgrade a combined Fischer Tropsch product and a triglyceride feed.

The present invention differs from the Mackay reference in that it is based on reforming natural gas. Natural gas by nature has a high hydrogen to carbon ratio. The result is that efficiently reforming the gas provides a $H_2$:CO ratio greater than required by the Fischer Tropsch reaction. The excess hydrogen can efficiently be utilized for downstream processing without sacrificing efficiency in the GTL portion of the plant. In the case of MSW, as with most biomass resources, the nature of the feed is deficient in hydrogen. Therefore, the gasifier is operated with excess water in the feed to produce a higher $H_2$:CO ratio. While there may be operational advantages to the high water feed, it is not optimum from a carbon standpoint, as more $CO_2$ will be produced in order to make hydrogen not only for the renewable section of the plant, but also to close the gap between the low $H_2$ content in the MSW to the ratio of about 2:1 needed for the Fischer Tropsch process. Also, while the hydrogen derived from natural gas is not renewable, it is much easier to produce since the contaminant level in natural gas is significantly less than MSW. In the case of natural gas reforming, the reformer can operate at 20-40 bars, sufficient to pass directly to the Fischer Tropsch reactor without further compression. Processing MSW at these pressures is costly and inefficient.

The Mackay process does not take advantage of recycling waste products from hydroprocessing of renewable feeds. The Mackay process also does not find advantage to the reduced $CO_2$ footprint enjoyed by the present invention, as the nature of the Mackay primary feed is considered to be renewable.

A type of co-processing of renewable feeds is taught by Knuuttila (U.S. Patent Publication No. 2010/0317903). In this reference, a biological feed is gasified to make synthesis gas. The synthesis gas is converted to Fischer Tropsch hydrocarbon products. The Fischer Tropsch hydrocarbon product is hydroprocessed and a separate bio oil is also hydroprocessed. The Fischer Tropsch products and hydroprocessed bio oils are combined and fractionated.

The present invention differs from the Knuuttila reference in that synthesis gas is generated by reforming natural gas, whereas Knuuttila gasifies biomass. In the present invention, excess hydrogen is efficiently extracted from the synthesis gas for downstream hydroprocessing, whereas Knuuttila produces hydrogen in a separate reformer by reforming waste components or imported methanol, recognizing that the biomass feed stream is deficient in hydrogen. The Knuuttila design gains no advantage of reduced carbon footprint enjoyed by the present invention, as it utilizes biological feed.

Gasification of a carbonaceous feed is taught by Blevins et al. (U.S. Patent Publication No. 2011/0178185). While the carbonaceous feed is clearly directed at renewable biomass, natural gas is included in the definition of carbonaceous feed. Unlike the present invention, this reference does not teach efficient extraction of hydrogen for downstream processing of renewable feeds or co-processing of such streams.

The present invention is directed to a process to efficiently utilize resources, such as hydrogen and infrastructure of a gas to liquids process, to efficiently co-process renewable fats and oils or polymers. Such processing enhances the GTL operation by reducing the carbon footprint, adding a small amount of renewable material into the Fischer Tropsch product and adding a new renewable product in a very capital and energy efficient manner.

A purpose and object of the present invention is to provide an integrated fuel processing system which has advantages over either a natural gas to liquids process or a biomass hydroprocessing process.

SUMMARY OF THE INVENTION

Renewable feedstocks containing triglycerides and free fatty acids can be advantageously converted into fuels and chemicals in combination with a gas to liquids (GTL) process. Excess hydrogen and export energy in the form of steam and/or fuel gas from the GTL process can be used to produce and hydroprocess the renewable feedstock.

A known gas to liquids process has three main components:
1) Conversion of natural gas to syngas ($H_2$+CO);
2) Conversion of syngas to hydrocarbons; and
3) Hydroprocessing of the synthesized hydrocarbons to make finished products.

The preferred method of the present invention is to use natural gas as the feedstock; however, it is within the scope of the process to use any carbonaceous feed. The syngas produced in the first step provides a source of hydrogen for the third step. This hydrogen may be removed by membrane or pressure swing adsorption ("PSA") or a combination or any method known to one skilled in the art. Only a fraction of the hydrogen is removed as required in the hydroprocessing step and to adjust the $H_2$:CO ratio for the Fischer Tropsch synthesis.

In the process of the present invention, the renewable natural feed material can be co-processed with the synthesized oil. The processing may be in one reactor, such as a hydrocracker, or in separate reactors, depending on whether it is desirable to end up with mixed products or separate products. It may also be desirable to process the renewable feed separate from the Fischer Tropsch derived feed, as the Fischer Tropsch material is much heavier (except when the renewable feed is a polymer) and will require more hydrocracking if, for example, the desired product is a middle distillate fuel. If the renewable products are hydroprocessed separate from the synthesized products, the finished products may be blended or used separately and both may be blended together or separately with conventional crude oil derived products.

In all cases, a portion of the hydrogen produced in the first step of the GTL process is used to hydroprocess the GTL product and the renewable oil, and export energy from the GTL process is used to process a renewable feed (crush or thermally depolymerize, for example) to produce all or part of the renewable oil.

Hydroprocessing of renewable oils in this manner results in the production of by-products, such as $H_2O$, CO, $CO_2$, propane and other light hydrocarbon by-products. All or a portion of these by-products can be advantageously recycled back to the first step of the GTL process to produce more synthesis gas, thereby increasing both the carbon and energy efficiency of the entire process.

When the synthesized products are co-processed or blended with the renewable products, the result is a unique composition of matter containing a blend of natural gas derived and renewable molecules. Products synthesized by the Fischer Tropsch reaction have a very uniform distribution of highly paraffinic molecules, including even and odd carbon numbers. The hydrocarbon chains produced by Fischer Tropsch include very long waxy chains. When they are hydrocracked to produce a jet or diesel fuel, the resulting product is distilled to the range required for the fuel. A diesel fuel, for example, has a carbon distribution with hydrocarbon chains ranging from about C10-C19. The hydrocracked material has paraffin and isoparaffin molecules in this range.

When the feedstock is a triglyceride and/or fatty acid, the naturally occurring products have a narrow distribution of carbon number. Triglycerides have three fatty acid chains linked to a three carbon backbone with an oxygen molecule between each chain. The three side chains are even number carbon chains with a narrow distribution of chain length generally in the C16-C20 range with a significant distribution around C18, which is acceptable for diesel, but outside the range of commercial jet fuel. Decarboxylation of the side chains will produce a fraction of odd number carbon chains.

When hydroprocessed, the oxygen molecules and the three carbon backbone of the triglyceride produce by-products including $H_2O$, CO, $CO_2$, propane and other light hydrocarbons. As such, this represents loss of material from the feed that will not be in the final product. Also, the C18 paraffin product can be used in the diesel product, however, commercial diesel typically contains a distribution of hydrocarbons in the C9 to C20 range. The diesel product can be improved with additional cracking and isomerization of the C18 to get a full range diesel with improved cold flow properties. This cracking will result in production of some shorter chain material that is too light for diesel or jet and, therefore, results in production of lower value (C5-C9) naphtha. However, these lighter products can also be recycled back to the reformer and converted to synthesis gas for further conversion to more desirable products.

When blended or co-processed with the synthesized material and/or petroleum derived products which have a full boiling range, there is less need to crack the renewable material.

Therefore, it can be advantageously processed to reduce the amount of light cracked material. Also, any light cracked material that is produced can be recycled to the first step to produce syngas that will be converted to product by Fischer Tropsch synthesis. The Fischer Tropsch synthetic material may therefore be composed of natural gas derived and renewable derived components.

The integrated process, if co-processed or blended, will result in a unique product composition. In the case of a diesel product, for example, the highly predictable distribution from a Fischer Tropsch synthesis and hydrocracking will be modified, showing a spike in the C16-C18 carbon number range from the addition of the renewable feedstock. The products will also show measurable amounts of C14 from the renewable materials.

The co-processing and/or blending of the renewable product with a GTL process can be done at great advantage to get the maximum benefit of low cost hydrogen and efficient utilization of the renewable feedstock. This process efficiently utilizes the resources (hydrogen) and infrastructure of the GTL process. It also efficiently utilizes lower value by-products of the co-processed renewable feed, such as propane, by producing additional synthesis product resulting in a reduced $CO_2$ footprint.

There are further benefits that may be realized by the present invention. Additional benefit to the co-processing facility may be derived by adding a processing facility (crushing, pyrolysis, thermal depolymerization, etc.) to produce the renewable oil feed, such as crushing canola seed, for example. The seed can be mechanically crushed, producing an oil and a meal product. The meal can be further processed, if desired, to extract more of the oil. Such processing typically involves solvent extraction. The crushing facility requires infrastructure, such as buildings and utilities and energy to operate. Integration of a crushing plant into the design of the present invention could be beneficial to the overall operation. The integrated GTL and renewable processing facility of the present invention will have operations capabilities that will be required by the crushing plant such as: operations personnel, roads, office buildings, laboratory, maintenance buildings, tankage and safety equipment. The GTL plant will produce export energy in the form of steam and/or fuel gas which can be used by the crushing plant. The meal produced can be sold into the animal feed market to reduce the net cost of the oil that can be processed with the GTL derived oil.

DETAILED DESCRIPTION OF THE PREFERRED EMBODIMENTS

The embodiments discussed herein are merely illustrative of specific manners in which to make and use the invention and are not to be interpreted as limiting the scope of the present invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
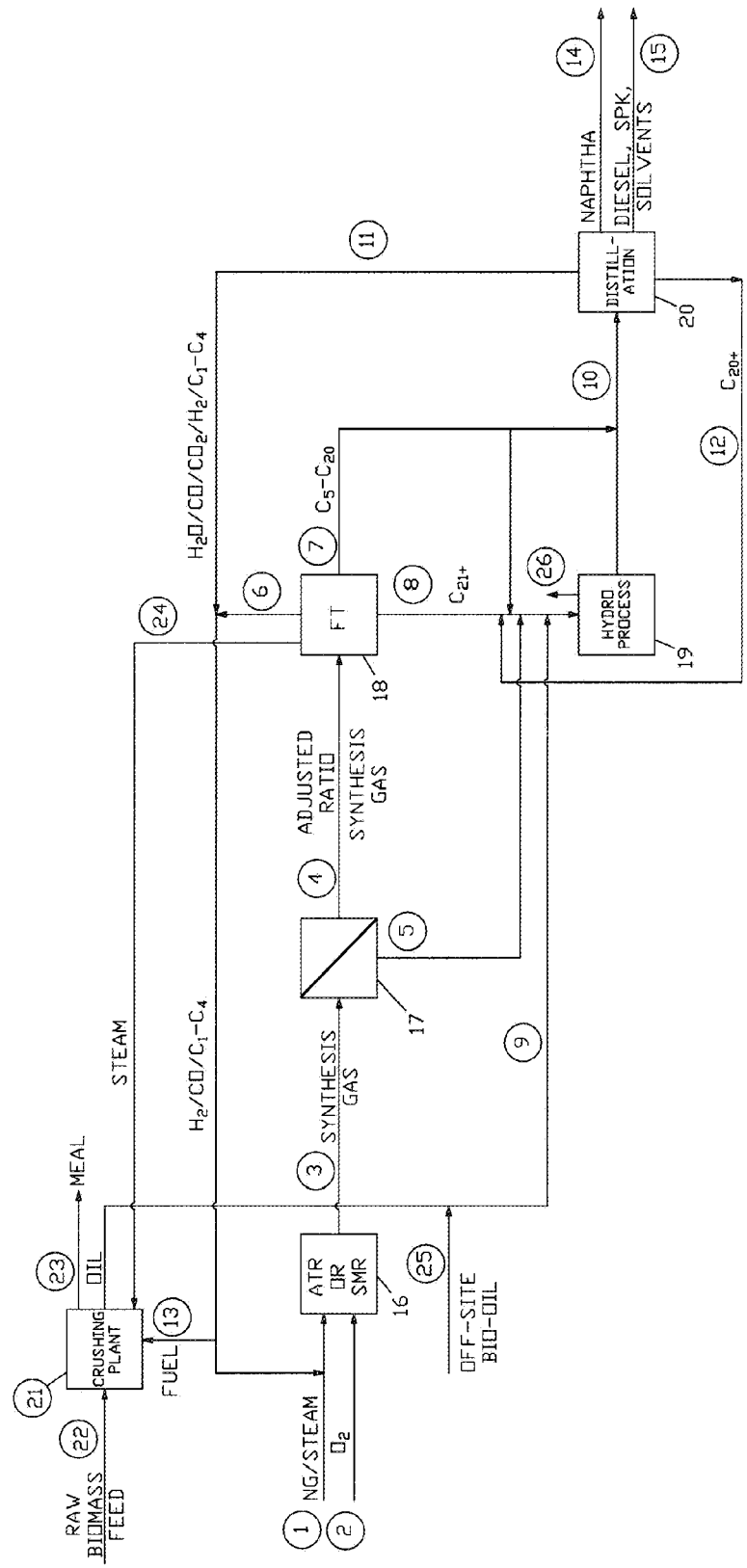
FIG. 1 is a process flow diagram of a first preferred embodiment of integrated fuel processing with biomass oil as set forth in the present invention.

FIG. 1 is a schematic diagram of a first preferred embodiment of the invention. In FIG. 1, natural gas and steam 1 are fed with oxygen 2 to a reformer 16. The reformer 16 is preferably a high temperature autothermal reformer (ATR). The preferred syngas generation technology is an ATR, however, if the renewable oil (to be described herein) requires more hydrogen than can be produced by the ATR, the syngas generation method could be a steam methane reformer, for example, which requires more steam and no oxygen.

Synthesis gas 3, comprising carbon monoxide and hydrogen, exits the reformer 16. The synthesis gas typically has an $H_2$:CO ratio of 2.2 to 2.6. The synthesis gas stream is separated into a hydrogen rich stream and a ratio adjusted synthesis gas stream in a hydrogen membrane separation unit 17. Such hydrogen rich stream may be further purified with PSA, for example. The ratio adjusted synthesis gas stream 4 has a preferred ratio of about 2:1. This ratio may be further adjusted within a Fischer Tropsch reactor unit 18, depending on the reactor configuration and operating conditions.

The ratio adjusted stream 4 is directed to a Fischer Tropsch reactor unit 18. The Fischer Tropsch unit 18 contains one or more Fischer Tropsch reactors configured in parallel and/or series with or without recycle to achieve desired targets for conversion and selectivity. The reactors may be fixed bed, fluidized bed, ebullating bed, microchannel or slurry bubble column reactors. Any reactor known to one skilled in the art may be used. The reactors may be configured in a manner desirable to achieve the objective of converting synthesis gas to hydrocarbon products. The $H_2$:CO ratio may be adjusted within the Fischer Tropsch unit to enhance performance, such as hydrocarbon selectivity.

Products from the Fischer Tropsch reactor may be separated a number of different ways. FIG. 1 illustrates three product streams: 1) a light gaseous stream 6 which contains unreacted synthesis gas $H_2$, CO, $CO_2$, any inerts that entered in feed streams and light hydrocarbons, primarily C1-C4; 2) an intermediate liquid hydrocarbon stream 7, predominately C5-C20 hydrocarbons. This stream is very paraffinic, but may contain significant amounts of olefins and alcohols. The concentration and distribution of non-paraffinic hydrocarbons may vary significantly depending on the catalyst and operating conditions employed in the Fischer Tropsch reactors; and 3) a heavy hydrocarbon stream 8 containing predominately C21+ paraffinic hydrocarbons.

All or a portion of the intermediate liquid hydrocarbon stream 7 may be blended with the heavy hydrocarbon stream 8 and a renewable feed stream 9 for hydroprocessing in unit 19, which includes hydrocracking, hydrodeoxygenation and hydrodecarboxylation. A crushing plant 21 may optionally utilize facilities, infrastructure and energy from the GTL plant to produce the renewable feed 9. Optionally, an external source of renewable oil can be added to stream 9.

Intermediate hydrocarbon stream 7 can completely by-pass the hydroprocessing unit or can be hydroprocessed in its entirety or any portion thereof. The amount that will be hydroprocessed will depend on the ratio of stream 7 to stream 8 produced by the Fischer Tropsch reactor and the specification of the finished product desired.

As seen in FIG. 1, raw biomass feed 22 is mechanically crushed in a crushing plant 21 to produce oil 9 and meal 23. Export energy from the GTL plant in the form of fuel 13 and/or steam 24 may be used to provide all or a part of the energy required to operate the crushing plant 21. Optionally, all or a part of fuel stream 13 and/or steam stream 24 can be used to generate electrical power to be used in the crushing plant 21 and/or in the chemical processes.

High purity hydrogen 5, which has been separated from the synthesis gas, is added to the hydroprocessing unit 19. This hydrogen may be further purified by pressure swing adsorption, for example, before addition to hydroprocessing unit 19. A portion of the intermediate liquid stream 7 may be by-passed around hydroprocessing unit 19 to provide a small amount of primary alcohols as a lubricity improver in the finished product(s) 15.

The hydroprocessed product 10 is fed to a distillation unit 20 for separation. Purge gases 26 from hydroprocessing are added to stream 11 for recycle to the reformer 16 or used as fuel gas. Purge gas 26 may optionally be recycled to the hydrogen membrane separation unit 17 to remove hydrogen.

The light gaseous stream 11 exiting the distillation unit 20 contains light hydrocarbons, primarily C1-C4, which can advantageously be recycled to reformer 16 by adding them into the reformer feed, resulting in a portion of the synthesis gas going to the Fischer Tropsch synthesis being of renewable origin.

A light paraffinic naphtha stream 14 is produced and then removed from the top of the distillation column 20. A middle distillate product 15 is produced and then removed from the side of the distillation column 20. The distillate product may be SPK (synthetic paraffinic kerosene for jet fuel), diesel, solvents or distillate blend stock. A heavy bottom cut 12 that is heavier than the desired end point of the middle distillate product is produced and then removed from the bottom of the distillation column and recycled to the hydroprocessing unit 19. This product will thereafter be cracked to extinction.

The distillate product may preferably be a jet fuel (SPK) or diesel product. If the distillate product requires a low pour point, it may be necessary to further hydrotreat and hydroisomerize one or more of the feed steams to increase the isoparaffin content of the products beyond what is produced by hydrocracking. All or a part of the straight run Fischer Tropsch liquid, for example, in the C9-C20 range, can be fed into a hydrotreater and subsequently into a hydroisomerization reactor. This additional hydroprocessing improves the pour point of the final product, allowing attainment of jet fuel (SPK) specifications. One skilled in the art can make such adjustments, depending on the product slate and target specifications.

Figure 2:
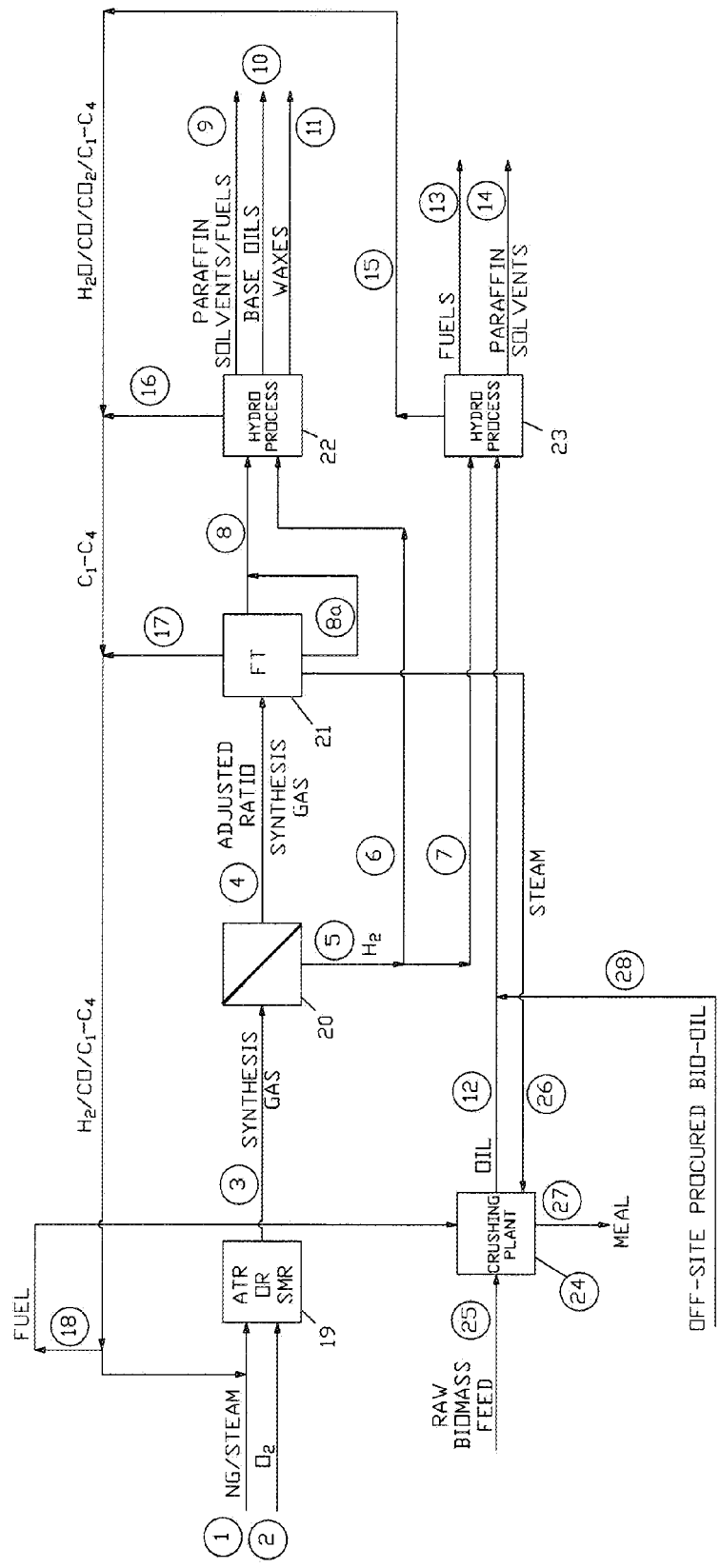
FIG. 2 is a process flow diagram of a second preferred embodiment of the present invention.

FIG. 2 is an alternate preferred embodiment of the present invention. In the process illustrated in FIG. 2, natural gas and steam 1 is fed along with oxygen 2 to a reformer 19. The reformer is preferably an autothermal reformer (ATR). The preferred syngas generation technology is an ATR, however, if the renewable oil requires more hydrogen than can be produced by the ATR, the syngas generation method could be a steam methane reformer, for example, which requires more steam and no oxygen.

A synthesis gas stream 3, comprising carbon monoxide and hydrogen, is produced and thereafter exits the reformer 19. The synthesis gas stream typically has a $H_2$:CO ratio of 2.2 to 2.6. The synthesis gas stream is separated into a hydrogen rich stream and a ratio adjusted synthesis gas stream in a hydrogen membrane separation unit 20. The hydrogen rich stream may be further processed by PSA, for example, to enrich the hydrogen concentration. The ratio adjusted synthesis gas stream 4 has a preferred ratio of about 2:1. This ratio may be further adjusted within a Fischer Tropsch unit 21, depending on the reactor configuration.

The Fischer Tropsch unit 21 contains one or more Fischer Tropsch reactors configured in parallel and/or series with or without recycle to achieve the desired targets for conversion and selectivity. The reactors may be fixed bed, fluidized bed, ebullating bed, microchannel or slurry bubble column reactors. Any reactor known to one skilled in the art may be used. The reactors may be configured in a manner desirable to achieve the objective of converting synthesis gas to hydrocarbon products. The $H_2$:CO ratio may be adjusted within the Fischer Tropsch unit to enhance performance, such as hydrocarbon selectivity.

Products produced in and exiting from the Fischer Tropsch reactor may be separated a number of different ways. FIG. 2 illustrates three product streams: 1) a light gaseous stream 17 which contains unreacted synthesis gas $H_2$, CO, $CO_2$, any inerts that entered in feed streams and light hydrocarbons, primarily C1-C4; 2) an intermediate liquid hydrocarbon stream 8, predominately C5-C20 hydrocarbons. This stream is very paraffinic, but may contain substantial amounts of olefins and alcohols. The concentration and distribution of non-paraffinic hydrocarbons may vary significantly depending on the catalyst and operating conditions employed in the Fischer Tropsch reactors; and 3) a heavy hydrocarbon stream 8a containing predominately C21+ paraffinic hydrocarbons.

The intermediate liquid hydrocarbon stream 8 and heavy hydrocarbon stream 8a can be processed together or separately in a hydroprocessing unit 22, depending on desired target product specifications. If paraffinic solvents 14 and waxes 11 are the target products, the hydroprocessing is a simple hydrotreating reaction used to saturate olefins. After distillation, there may be need to polish one or more of the streams to improve color. If the objective is to make base oils 10 in hydroprocessing unit 22, the operation will include a hydroisomerization reactor to increase the isoparaffin content of the feed stream. Again, it may be necessary to polish one or more finished products to improve color. Light hydrocarbons 16 generated by mild cracking in hydroprocessing unit 22 may be recycled to reformer 19 for producing additional synthesis gas or may be used as fuel gas 18. The hydrogen rich stream 5 extracted by membrane unit 20 can be purified (i.e. such as by pressure swing adsorption) and split into two streams, stream 6 and 7. Stream 6 provides hydrogen for hydroprocessing unit 22 and stream 7 provides hydrogen necessary for hydroprocessing in hydroprocessing unit 23 with renewable feed stream 12, which optionally includes renewable feed 28 from an external source.

Intermediate hydrocarbon stream 8 can by-pass the hydroprocessing unit and be added back before distillation (not shown) or can be hydroprocessed in its entirety or any portion thereof. The amount that will be hydroprocessed will depend on the ratio of stream 8 to stream 8*a* produced by the Fischer Tropsch reactor and the specification of the finished product desired.

A crushing plant 24 may optionally utilize facilities, infrastructure and energy from the GTL plant to produce a renewable feed oil 12. The plant 24 could optionally be any type of plant that removes a renewable oil from a renewable feed, such as crushing, thermal depolymerization and pyrolysis. Raw biomass feed 25 is at least mechanically crushed in this example to produce oil 12 and meal 27. Export energy derived from the GTL process described herein in the form of fuel 18 and/or steam 26 may be used to provide all or a part of the energy required to operate the crushing plant 24. Optionally, all or a part of fuel stream 18 and/or steam stream 26 can be used to generate electrical power to be used in the crushing plant and/or in the chemical processes. The renewable feed will be hydrodeoxygenated and/or hydrodecarboxylated in hydroprocessing unit 23, resulting in production of $H_2O$, CO, $CO_2$. These by-products, along with light hydrocarbon gases from hydrocracking stream 15, can be recycled to the reformer 19 to produce additional synthesis gas. The hydrocarbon products can be saturated and used as paraffin solvents 14 or subjected to additional hydroisomerization, if required, in hydroprocessing unit 23 to produce jet (SPK) and diesel fuels 13.

The products from hydroprocessing unit 22 and hydroprocessing unit 23 may be blended or kept separate. The products are compatible with petroleum derived products and may be blended with them in any proportion.

In this configuration, the products from hydroprocessing unit 23 are totally renewable, while the products from hydroprocessing unit 22 are only partially renewable.

A non-limiting example utilizing the process set forth in FIG. 1 is illustrative of the process of the present invention.

Example

Natural gas (21.6 MMSCFD) was directed to and reacted in an autothermal reformer along with (13.1 MMSCFD) 99.5% oxygen to produce 73.2 MMSCFD of synthesis gas 3 of the following composition:

| Component | Mol % |
|---|---|
| $H_2$ | 64.98 |
| CO | 28.14 |
| $CO_2$ | 5.54 |
| Ar | .08 |
| $N_2$ | .18 |
| $C_1$ | 1.08 |

A hydrogen membrane separation unit 5 was used to extract approximately 4.0 MMSCFD of a hydrogen rich stream from the synthesis gas stream. The hydrogen was further purified and compressed for later use in the product refining section of the process.

The adjusted ratio synthesis gas, after hydrogen extraction, was reacted over a cobalt Fischer Tropsch catalyst in a Fischer Tropsch reactor in multiple stages to a CO conversion of approximately 92%, resulting in the production of 2,218 BPD of a synthetic crude product. The synthetic crude is collected in separators as a heavy Fischer Tropsch liquid (wax 1,748 BPD) and a light Fischer Tropsch liquid (oil 471 BPD).

Approximately 850 tons/day of canola seed is mechanically crushed producing 1,900 BPD of refined canola oil and 592 tons/day of a high quality canola meal. Export energy from the process, in the form of steam, is used to heat the canola seeds to 200° F. to enhance the crushing operation. Medium pressure steam from the GTL process is also used to drive the mechanical crushing unit, which requires 2,400 HP. The GTL tail gas or steam could also be used to generate power to operate the crushing plant. Approximately 10 MMBTU/HR of medium pressure steam is required to heat the biomass to the desired temperature. The cost to provide the renewable oil on site is greatly reduced by utilizing energy resources and infrastructure of the GTL plant and selling the meal to partially offset the oil cost.

The heavy Fischer Tropsch syncrude (1,748 BPD) is blended with a portion of the light syncrude and approximately 1,900 BPD of clean degummed canola oil. This combined mixture is sent to the hydroprocessing section of the plant where sequential reactors fully hydrogenate the canola oil, producing linear paraffins along with water, $CO_2$ and light hydrocarbons (predominantly propane). The combined product is fractionated so that the C19+ portion is sent to a hydrocracker to produce jet and diesel range hydrocarbons with modest amounts of naphtha (C5-C9) and light hydrocarbons C4−, which can be recycled back to the front of the system to make additional syngas. The C19− fraction is sent to a hydroisomerization unit to convert the linear paraffins to isoparaffins. Some cracking can occur in this reactor, leading to additional naphtha and C4− hydrocarbons, which are recycled to produce additional syngas. The effluent hydrocarbon streams, consisting of C5+ linear and branched isomers, are sent to a final fractionation tower where the naphtha, jet and diesel products are recovered. The amount of each product can vary, depending upon the extent of hydroisomerization and hydrocracking that occurs in the reactors. In this example, the product slate consists of 460 BPD of naphtha, 2,330 BPD of jet (SPK) and 1,260 BPD of diesel. The diesel product contains over 58% renewable carbon, while the jet contains approximately 45% renewable carbon. The product slate and amount of renewable carbon can vary, depending on the hydroprocessing configuration. As more jet is produced, the diesel product volume decreases and the naphtha volume increases.

Whereas, the present invention has been described in relation to the drawings attached hereto, it should be understood that other and further modifications, apart from those shown or suggested herein, may be made within the spirit and scope of this invention.

What is claimed is:

1. A reduced $CO_2$ footprint gas and renewable feed to liquid hydrocarbons and chemicals, combined process comprising the steps of:
    a) converting natural gas to synthesis gas comprising $H_2$ and CO;
    b) extracting a minor portion of the $H_2$ of step a) from the synthesis gas for downstream processing;
    c) converting the ratio adjusted synthesis gas to hydrocarbons in a Fischer Tropsch reaction;
    d) processing a renewable feed in a crushing plant to extract a renewable oil feed, where the renewable feed and the renewable oil feed are distinct from the natural gas, the synthesis gas, and the Fischer Tropsch hydrocarbons;
    e) thereafter upgrading the Fischer Tropsch hydrocarbons and the renewable oil feed with the extracted hydrogen of step b) in a hydroprocessor in a GTL plant to produce hydrocarbon products;
    f) recycling waste products from the hydroprocessing back to step a), to make additional synthesis gas; and g) using waste energy from step e) to supply at least part of the energy required in the crushing plant to process the renewable feed to extract the renewable oil in step d).

2. The process according to claim 1 wherein the renewable feed stock material includes raw biomass feeds such as grasses, crops, algae and seeds.

3. The process according to claim 1 wherein the hydrogen stream of step b) is further purified to increase hydrogen purity.

4. The process according to claim 1 wherein synthesis gas is produced in an autothermal reformer.

5. The process according to claim 1 wherein synthesis gas is produced in a steam methane reformer.

6. The process according to claim 1 wherein the synthesized hydrocarbon products and the renewable products may be blended together in any ratio and may be blended together or separate with other hydrocarbon products in any ratio.

7. The process according to claim 1 wherein the renewable oil is processed in the same hydroprocessing unit and/or distillation unit resulting in blended Fischer Tropsch and renewable products.

8. The process according to claim 1 wherein the renewable oil is processed in separate hydroprocessing and distillation units resulting in separate Fischer Tropsch and renewable products.

9. The process according to claim 1 wherein the hydrocarbon products include jet, diesel or jet and diesel blend stocks, synthetic crude, paraffin oils, paraffin waxes, base oils and naphtha.

10. The process according to claim 1 wherein the Fischer Tropsch reactor is a fixed bed, fluidized bed, ebulating bed, microchannel or slurry bubble column reactor.

11. The process according to claim 1 wherein the catalyst utilized in the Fischer Tropsch reaction is an iron based or cobalt based catalyst.

12. The process according to claim 1 wherein any of the hydrocarbon products may be subjected to additional hydroprocessing or filtering processes to enhance color, stability or performance.

13. The process of claim 1 wherein step d) comprises crushing, thermal depolymerization and pyrolysis.

* * * * *